(12) United States Patent
Vetrovec et al.

(10) Patent No.: US 7,751,460 B2
(45) Date of Patent: Jul. 6, 2010

(54) SOLID STATE LASER WITH BEAM PATH CONDITIONING

(75) Inventors: Jan Vetrovec, Larkspur, CO (US); Charles C. Thompson, Moorpark, CA (US); Tri H. Tran, Arcadia, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/405,281

(22) Filed: Apr. 17, 2006

(65) Prior Publication Data

US 2009/0122821 A1     May 14, 2009

(51) Int. Cl.
H01S 3/04     (2006.01)
H01S 3/14     (2006.01)
H01S 3/22     (2006.01)

(52) U.S. Cl. .......................... 372/55; 372/39
(58) Field of Classification Search ............ 372/55, 372/39
See application file for complete search history.

(56) References Cited

U.S. PATENT DOCUMENTS

| 4,237,428 A | * | 12/1980 | Wexler et al. ............ 372/90 |
| 4,807,242 A | * | 2/1989 | Kim ...................... 372/87 |
| 5,105,428 A | * | 4/1992 | Pocholle et al. .......... 372/24 |
| 6,330,256 B1 | * | 12/2001 | Byren et al. ............. 372/21 |
| 2005/0259704 A1 | * | 11/2005 | Goto et al. ............... 372/39 |

* cited by examiner

*Primary Examiner*—Minsun Harvey
*Assistant Examiner*—Patrick Stafford
(74) *Attorney, Agent, or Firm*—Haynes and Boone, LLP

(57) ABSTRACT

A solid state laser system having at least one gas injector is disclosed. The gas injector may be configured to so as cause gas flow in a path of the laser beam in order to mitigate distortion of the laser beam due to optical path difference. Each gas injector may be configured so as to cause gas flow proximate at least one optical surface of a solid state gain element of the laser beam system. In this manner gain uniformity may be enhanced so as to facilitate use of the laser system in a variety of military and commercial applications.

5 Claims, 3 Drawing Sheets

SOLID STATE LASER WITH BEAM PATH CONDITIONING

STATEMENT REGARDING FEDERALLY SPONSORED RESEARCH OR DEVELOPMENT

This invention was made with Government support under contract no. F49620-02-C-0035 (MCDL) awarded by the United States Air Force. The Government has certain rights in this invention.

TECHNICAL FIELD

The present invention relates generally to lasers and, more particularly, to a solid state laser that uses at least one gas injector to provide beam conditioning in order to mitigate distortion of a laser beam's wavefronts.

BACKGROUND

Solid state lasers (SSL) are well known. Examples of solid state lasers include high average power (HAP) solid state lasers and high-energy lasers (HEL). Such lasers may be used for a variety of military and commercial applications. Military applications include target illumination/designation for air defense and precision strike. Commercial applications include cutting and welding in the aerospace, automotive and shipbuilding industries.

In such solid state lasers, gain uniformity and low optical phase error are critical with respect to achieving good beam quality, as well as with respect to facilitating operation at high average power. By maintaining good beam quality, more powerful and more economical high average power solid state lasers may be constructed.

However, contemporary high average power solid state lasers suffer from deficiencies that tend to detract from desirable beam quality. For example, the beams of contemporary high average power solid state lasers may pass through thermal eddy currents that perturb the optical phase fronts thereof. Thus, such thermal eddy currents cause undesirable degradation to beam quality.

More particularly, solid state lasers use one or more solid state gain elements that are doped with rare earth ions. During laser operation these ions are excited by optical radiation to a laser transition. A portion of the excitation energy is unavoidably converted into heat which is dissipated within the solid state gain element. To sustain continuous operation of the laser, the solid state gain element is cooled.

For practical reasons, solid state laser coolant is typically delivered at about room temperature. For efficient heat transfer, the solid state gain element generally operates at a temperature that is significantly higher than the coolant temperature.

In contrast, other solid state laser components such as lenses, mirrors, an optical bench and enclosures typically are un-cooled and operate at approximately ambient (room) temperature. A laser beam is transported by such lenses and mirrors into and out of the solid state gain element.

The space between the solid state gain element and the beam transport components is often very large compared to the size of the gain elements. This space is typically filled with a gas such as air, nitrogen, or helium. Since the gas is in intimate contact with various solid state laser components at ambient temperature, the gas is also generally at approximately ambient temperature.

During laser operation, the temperature of the gain elements typically rises well above ambient temperature. This is especially true with respect to the gain element's surfaces through which the laser beam enters or exits the gain element, because such surfaces are typically not cooled. The surfaces of the gain element heat the gas in the vicinity of these surfaces. This heating of the gas generates thermal gradients and thermal eddy currents.

A laser beam passing through such thermal eddy currents experiences both temporal and spatial variations in index of refraction. As a result, the optical phase fronts of the beam are undesirably perturbed. This perturbation translates into a reduction in beam quality.

The reduction in beam quality may be small enough to be neglected in many low or medium average power solid state laser systems. However, the reduction in beam quality is very detrimental to the performance of high average power solid state laser systems, such as those used for military applications and for precision material processing, e.g., cutting and welding.

Thus, it is desirable to provide a way to mitigate the detrimental effects of thermal eddy currents in the gas atmosphere of a high average power solid state laser system. This is especially true for those thermal currents that pass through the laser beam.

SUMMARY

Systems and methods are disclosed herein to provide for the mitigation of thermal eddy currents in solid state laser systems that tend to cause an undesirable reduction in beam quality. For example, a solid state laser system may comprise at least one gas injector configured so as to cause gas flow in a path of the laser beam in a manner which mitigates distortion of the laser beam due to optical path difference.

More particularly, the gas injectors may be configured so as to cause gas flow proximate at least one, typically two, optical surfaces of a solid state gain element of a high average power laser beam system.

The gas flow injectors may be configured so as to cause gas flow over two optical surfaces of the solid state gain element of a high average power laser beam system. The gas flow may be generally parallel with respect to the optical surfaces.

The gas flow injectors may comprise a generally linear array of gas nozzles. The use of such an array of gas nozzles may provide more uniform flow of gas. Other configurations of the gas nozzles may alternatively be used.

Thus, a solid state laser system may comprise a source of gas, a filter configured to filter the gas, a control valve configured to regulate flow of the gas, and interconnecting fluid conduits. The injectors' gas may be configured to provide subsonic, sonic, and/or supersonic gas flow in the path of the laser beam.

A heater may be used to heat the gas, such as to a temperature between ambient temperature and a temperature of the solid state gain element. Such heating of the gas reduces thermal gradients and thus mitigates the generation of thermal currents.

The gas may be an inert gas. For example, the gas may be helium, argon, nitrogen, or air. As a further example, the gas may be a mixture containing any desired combination of helium, argon, nitrogen and air.

The gas injector and/or the source of the gas may be configured so as to cause the gas to flow at a rate that results in the optical path difference (OPD) being below a predetermined threshold. For example, the gas injector and/or a source of the gas may be configured so as to cause the gas to flow at a rate that results in less than $1/12$th of a wave of distortion.

A plurality of semiconductor diodes may be configured to directly optically pump radiation into the solid state medium. As those skilled in the art will appreciate, other means of optically pumping radiation into the solid state medium may be used.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

One or more embodiments of the present invention comprise a solid state laser system with beam path conditioning. The laser system may be a high average power (HAP) or high energy laser (HEL) system. The laser system may have at least one gas injector configured to generate a flow of gas over one or more surfaces of a solid state gain element. For example, the gas injector may be configured to generate a flow of gas over the surfaces of the solid state gain element that are used for laser beam entry and exit. The gas injector may be configured to cause the gas to flow in a path that is substantially perpendicular to the laser beam.

The gas flow may thus mitigate, e.g. sweep out, thermal eddy currents and thereby establish a well defined boundary flow. This well defined boundary flow reduces undesirable perturbations to the laser beam wavefronts and therefore substantially enhances beam quality.

Optionally, the gas may be heated prior to injection to better reduce the thermal gradients and to prevent undesired cooling effects on the gain element.

Figure 1:
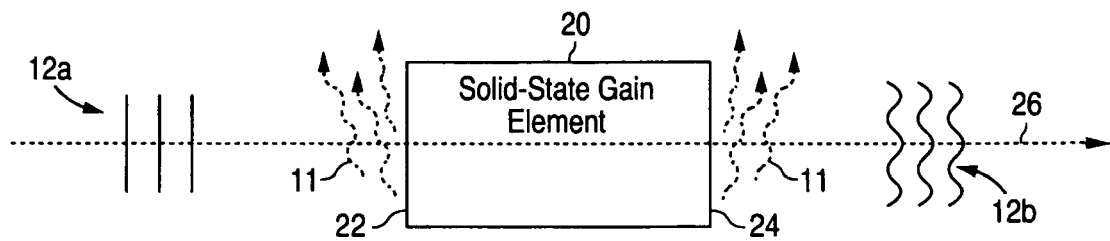
FIG. 1 shows a schematic block diagram illustrating a contemporary high average power solid state laser system wherein thermal eddy currents undesirably reduce beam quality.

FIG. 1 shows a schematic block diagram of a contemporary solid state laser system without beam path conditioning wherein thermal eddy currents 11 degrade laser beam 26 having initially flat phase fronts 12a and resulting in perturbed optical phase fronts 12b.

More particularly, a portion of the excitation energy provided to solid state gain element 20 is converted into heat, as described above. This heat undesirably forms eddy currents 11 in the gas proximate the surfaces 22 and 24 of solid state gain element 20 where laser beam 26 enters and exits solid state gain element 20.

Eddy currents 11 cause laser beam 26 to experience spatial and temporal variations in the index of refraction of the gas medium. As a result, the optical phase fronts of laser beam 26 are perturbed, thus resulting in an undesirable reduction in beam quality.

This reduction in beam quality inhibits the ability to focus laser beam 26 according to well known principles. Therefore, the operational range of laser beam 26 is reduced, the precision with which laser beam 26 may perform cutting and welding operations is reduced, the energy density of the laser beam at the focus is reduced, and the amount of laser beam power required to deliver a given amount of power to a predefined area is increased.

Thus, because of beam degradation a larger solid state laser system is generally required to accomplish a given task. It is worthwhile to appreciate that it is not always possible to provide a larger solid state laser system. This is particularly true in battlefield and other remote situations, wherein limitations on weight, size, and power availability may limit the size of the solid state laser system. Therefore, it is worthwhile to attempt to maximize the amount of power that may be effectively delivered by a solid state laser system by enhancing the beam quality thereof.

Solid state laser systems typically comprises means for excitation of the gain element to generate optical gain at one or more laser transitions and a coolant system for removing waste heat from the gain element. Such excitation means may include semiconductor laser diodes, flash lamps, electric discharge and electric arc amps. Surfaces 22 and 24 of solid state gain element 20 may include optical coatings, especially antireflective coatings at the lasing wavelength.

Figure 2:
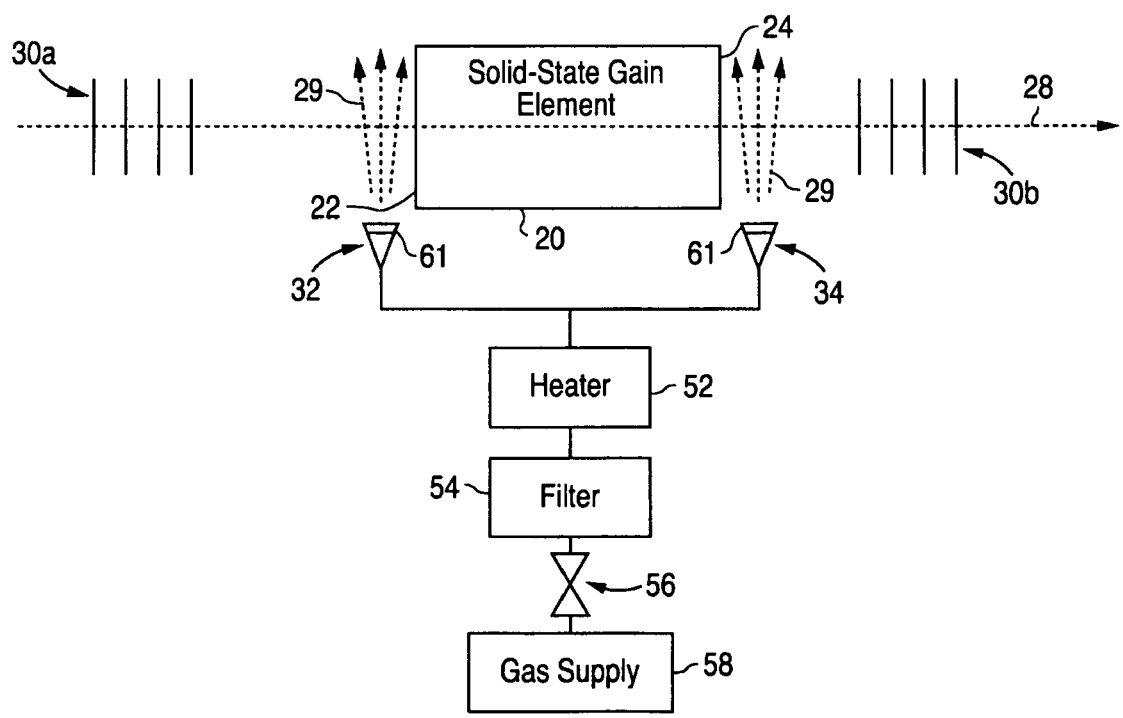
FIG. 2 shows a schematic block diagram illustrating a high average power solid state laser system wherein the detrimental effects of thermal eddy currents are mitigated by the use of gas injectors, in accordance with an exemplary embodiment of the present invention.

FIG. 2 shows a schematic block diagram of solid state laser system with beam path conditioning in accordance with an exemplary embodiment of the present invention. The solid state laser system again comprises solid state gain element 20 having surfaces 22 and 24. However, laser beam 28 has enhanced beam quality with respect to beam 26 of the contemporary solid state laser system of FIG. 1 because the generation of thermal eddy currents (such as thermal eddy currents 11 of FIG. 1) is substantially mitigated.

More particularly, according to one or more embodiments of the present invention injectors 32 and 34 inject gas flows 29 proximate one or both surfaces 22 and 24. Injectors 32 and 34 may be configured such that the injected gas flows are generally parallel to surfaces 22 and 24.

Gas flows 29 substantially mitigate or wash away thermal eddy currents 11 (FIG. 1), such that undesirable spatial and temporal variations in the index of refraction of the gas medium are substantially mitigated. As a result, undesirable perturbation of the optical phase fronts 30a and 30b of laser beam 28 is substantially mitigated, thus resulting in a desirable enhancement in beam quality. That is, the optical phase fronts 30b of laser beam 28 tend to be substantially more planar (resulting in substantially plane wave optical phase fronts).

A heater 52, a filter 54, a control valve 56, a gas supply 58 and interconnecting fluid conduits may be used to provide gas to injectors 32 at a controlled pressure, temperate, and flow rate. Examples of suitable gases include helium, argon, nitrogen, air, and mixtures of these gases.

Heater 52 may be adapted for heating the gas and may use electric resistive heating. As those skilled in the art will appreciate, other means for heating the gas, e.g., heating via the combustion of natural gas, are likewise suitable.

Injectors 32 and 34 may be subsonic, sonic and/or supersonic. That is, injectors 32 and 34 may comprise nozzles 61 that accelerate or decelerate the flow of gas therethrough to the desired velocity, according to well known principles. Gas flow injectors 32 and 34 may comprise a generally linear array of gas nozzles.

During laser operation, valve 56 may be open such that gas flows at a predetermined flow rate from the gas supply 58 through valve 56, filter 54 and heater 52 to injectors 32 and 34 and then out through nozzles 61 thereof. The gas may be heated in heater 52 to a predetermined temperature. The temperature to which the gas is heated may be between the temperature of the coolant in the coolant system and the temperature of the solid state gain element 20. The temperature of the coolant may be below ambient temperature, at ambient temperature, or above ambient temperature.

The flow rate though injectors 32 and 34 may be to set so as to prevent thermal eddy currents and so as to appropriately reduce thermal boundary layer such that laser beam 28 experiences tolerable optical path difference (OPD). For example, the flow rate of gas through injectors 32 and 34 may be set so as to provide less than $1/12$th of a wave of distortion across the beam aperture.

Figure 3:
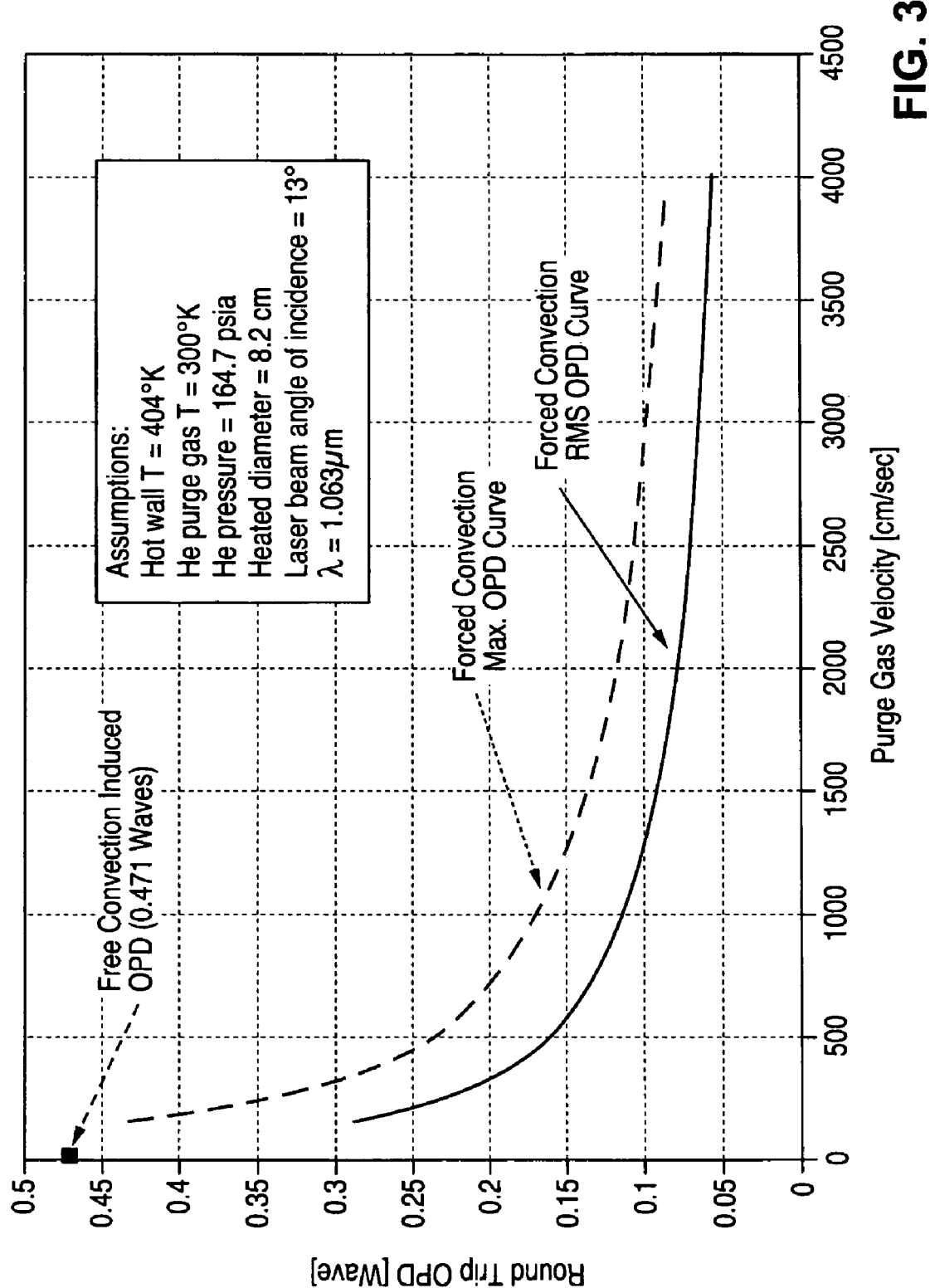
FIG. 3 shows a chart illustrating a relationship between optical path difference and velocity of gas flow through the gas injectors (purge gas velocity), in accordance with an exemplary embodiment of the present invention.

FIG. 3 shows a relationship between optical path difference (OPD) and velocity of flows 29 for a given configuration of the gain element. As seen, lower purge gas velocities generally result in higher round trip optical path difference.

Figure 4:
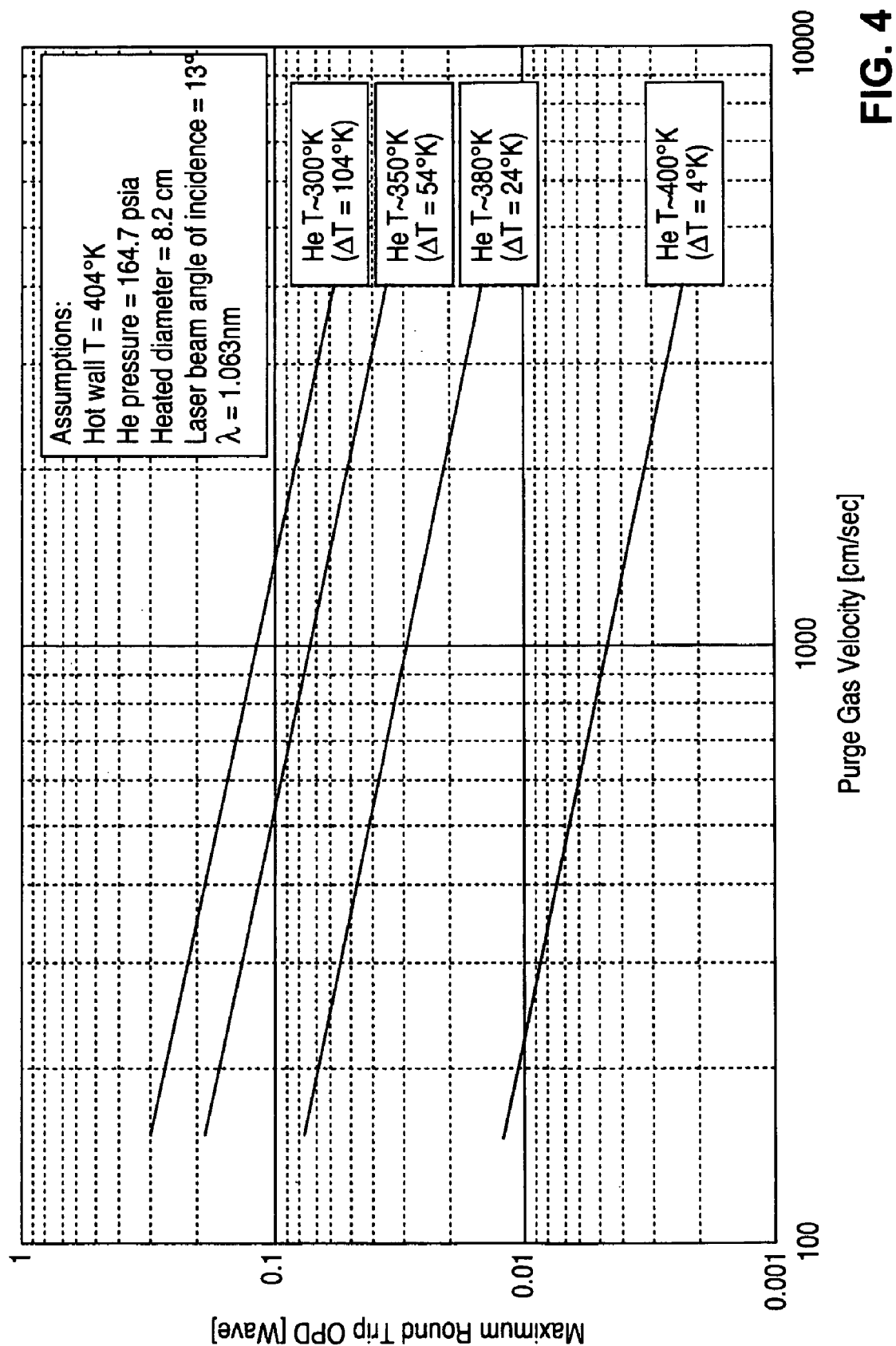
FIG. 4 shows a chart illustrating the effects of heating the gas prior to injection, in accordance with an exemplary embodiment of the present invention.

FIG. 4 shows that heating the gas prior to injection further reduces optical path difference. Thus, heating the gas generally enhances beam quality.

It has been found that the use of helium may result in less than $1/12$th of a wave distortion across the beam aperture. This amount of distortion is generally acceptable for many different applications.

The increase in beam quality provided by one or more embodiments of the present invention enhances the ability to focus laser beam 26 according to well known principles. Therefore, the operational range of laser beam 26 is increased, the precision with which laser beam 26 may perform cutting and welding operations is increased, the amount of energy that may be delivered to a predefined area is increased, and the amount of laser beam power required to provide a given energy density to a predefined area is reduced. Thus, a smaller solid state laser system is generally required to accomplish a given task.

One or more embodiments of the present invention facilitate enhanced gain uniformity and mitigated optical phase error, such that beam quality is substantially improved. Improved beam quality enhances the use of solid state lasers in military applications such as target illumination/designation for air defense and precision strike, as well as in commercial applications such as cutting and welding in the aerospace, appliance and shipbuilding industries. Improved beam quality may also facilitate new applications, such as rock drilling for oil and gas exploration.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method for operating a laser, the method comprising:
   generating a laser beam using a solid state gain element, the solid state gain element
   having at least one optical surface and the laser beam having a distortion caused by thermal eddy currents adjacent to the optical surface(s); and
   injecting heated gas into a path of the laser beam proximate the optical surface(s) to mitigate the distortion.

2. The method as recited in claim 1, further comprising heating the gas prior to injecting the gas, the gas being heated to a temperature between ambient and a temperature of the solid state gain element so as to reduce thermal gradients and thus mitigate the generation of thermal currents.

3. The method as recited in claim 1, wherein injecting gas into a path of the laser beam proximate the optical surface comprises using a linear array of nozzles to inject gas outside of the gain element so as to enhance uniformity of gas flow through the laser beam.

4. The method as recited in claim 1, wherein injecting gas into a path of the laser beam comprises injecting the gas perpendicular to the laser beam.

5. The method as recited in claim 1, wherein injecting gas into a path of the laser beam comprises injecting inert gas into a path of the laser beam.

\* \* \* \* \*